United States Patent [19]

Craig et al.

[11] 4,381,970

[45] May 3, 1983

[54] THERMOCATALYTIC REACTOR AND PROCESS FOR PRODUCING SAME

[76] Inventors: Laurence B. Craig, 116 Duck Pond Rd., Glen Cove, N.Y. 11542; Alfred J. Farina, 1939 Anita Ct., Baldwin, N.Y. 11510

[21] Appl. No.: 346,278

[22] Filed: Feb. 5, 1982

[51] Int. Cl.³ .......................... D21H 5/18; D21J 7/00
[52] U.S. Cl. .................. 162/152; 162/181.4; 162/181.6; 162/183; 162/228; 252/477 R
[58] Field of Search .................. 162/145, 181.4, 181.6, 162/152, 228, 231, 183; 264/87, 56; 428/36, 35; 252/455 R, 477 R

[56] References Cited

U.S. PATENT DOCUMENTS

| | | | |
|---|---|---|---|
| 3,275,497 | 9/1966 | Weiss et al. | 162/152 |
| 3,383,159 | 5/1968 | Smith | 252/477 R |
| 3,697,447 | 10/1972 | Bettinardi | 252/477 R |
| 4,041,199 | 8/1977 | Cartwright | 428/36 |

*Primary Examiner*—Peter Chin

[57] ABSTRACT

The present invention contemplates a process for producing a reactor cylinder for use in a radiant heater and the reactor cylinder produced by that process. A liquid vehicle is initially prepared including an alumina dispersion, magnesium sulfate, colloidal silica and powdered talc. An antifoam agent may be added. The alumina dispersion includes dispersable alumina in an amount between about 1% and about 5% by weight, an acid in an amount up to about 0.2% by weight and water in an amount between about 10% and about 30% by weight, all calculated as weight precent based on the weight of the liquid vehicle. The alumina dispersion is then further diluted by the addition of water in an amount between about 40% and about 80% by weight. To the diluted alumina dispersion is added magnesium sulfate in an amount up to about 4% by weight, colloidal silica in an amount up to about 10% by weight and powdered talc in an amount between about 0.0001% and about 0.1% by weight. A solid alumina and silica fiber composition is then added to the vehicle in a ratio of about 10 grams of solid fiber per gallon of vehicle. The mixture or slurry is then chopped, blended and vacuum molded about a mandrel to form the reactor cylinder.

7 Claims, No Drawings

THERMOCATALYTIC REACTOR AND PROCESS FOR PRODUCING SAME

BACKGROUND OF THE INVENTION

The present invention relates generally to a thermocatalytic reactor of the type used in a radiant heating unit and to a process for producing same. The reactor of the present invention is particularly adapted for use in a radiant heater of the flameless gas combustion type. In such heaters, a thermocatalytic reaction is sustained at or near the outer surface of a thermocatalytic reactor cylinder causing it to incandesce and produce an output of radiant energy. An example of such a flameless radiant heater including a thermocatalytic reactor is illustrated in U.S. Pat. No. 3,275,497 entitled METHOD OF MOLDING A COMBUSTION ELEMENT OF CERAMIC FIBERS ON A POROUS SUPPORT which issued on Sept. 27, 1966 to Gerhart Weiss et al., the disclosure of which is expressly incorporated herein by reference thereto.

In such radiant heaters, the thermocatalytic reactor typically constitutes a refractory cylinder enclosed at one end. A plurality of discrete, amorphous, inorganic ceramic fibers are generally arranged in the homogenous, porous wall structure of the reactor cylinder. The open end of the reactor cylinder is generally mounted on a hollow fitting which extends through a metal reflector. A combustable, air-gas mixture is passed through the center of the cylinder and the pores of the reactor cylinder wall cause the outer surface thereof, upon combustion, to incandesce. Reactors of this type will normally remain thermally stable for prolonged periods of time at relatively high operating temperatures.

The aforementioned combustion reaction in flameless and, because of the relatively low thermal conductivity of the reactor cylinder, there is no flashback of the reaction into the interior of the reactor cylinder. A relatively high percentage of the thermal output of the reactor cylinder is radiant energy.

Heretofore, combustion reactor cylinders of this type were produced by a process which included the addition of a filler or binder material added during processing to chemically bind the reactive components together. As described, for example, in U.S. Pat. No. 3,275,497, the components of the cylinders including alumina and colloidal silica were admixed in a molding bath and then dispersed in water. An aqueous solution of aluminum nitrate was then added to form a gel which was then further diluted in water. Chopped fibers formed from a melt of alumina $Al_2O_3$ and silica $SiO_2$ were then added to form a slurry. A preferred fiber was derived from Kaolin. A filler or binder, such as, for example, methyl methacrylate, was then added to chemically bind the alumina fibers and silica together.

The slurry was then formed into a reactor cylinder by adhesion around a screen mounted on a base which became the inner tube of the reactor cylinder. This inner tube during formation of the cylinder would typically be connected to the suction line of a pump and be immersed in the gel molding bath for a period of time sufficient to deposit an adequate amount of the gel on the screen to form the molded reactor cylinder. After removal from the bath, the cylinder was dried at a temperature between about 140° F. and about 150° F. for a period of time between about 10 and about 60 minutes. After drying, the reactor cylinder was then baked in a kiln at a relatively high temperature, i.e., in excess of 1100° F., in order to sublime the methyl methacrylate binder. In this prior art process, the kiln heating operation was a required processing step since the binder had to be sublimed. Heating to such temperatures, however, had a deleterious affect on the alumina fibers located in the reactor cylinder. At temperatures below about 1800° F., the alumina fibers were generally in either the gamma or theta phase or a combination thereof. At temperatures above 1800° F., however, the alumina fibers undergo a further phase transformation into the alpha phase. As the alumina transforms from gamma to theta and then to alpha, there is a tendency for the alumina fibers to densify, thereby reducing the porosity and available surface area of the resultant reactor cylinder.

It was recognized in U.S. Pat. No. 3,275,497 that, ordinarily, the phase of the alumina fibers in the reactor cylinder had little, if any, consequence on its operational characteristics. In certain situations, however, particularly when catalytic agents were added to the bath for deposit on the surface of the fibers, the gamma phase of the alumina was preferable because of its generally higher surface to mass ratio.

As previously stated, it is preferred that the reactor cylinder be porous and provide as large a surface area as possible in order to most efficiently serve as a combustible source. Accordingly, whenever possible, it is preferable that the alumina in the reactor cylinder be primarily in the gamma or theta phases rather than in the denser alpha phase. This was heretofore impossible due to the fact that the binder had to be sublimed at temperatures in excess of 1100° F. which resulted in a reactor cylinder which was denser and less porous than optimally preferred.

The process of the present invention attempts to provide a more optimal reactor cylinder formed without a binder. This permits elimination of the step of heating the cylinder in a kiln at a temperature in excess of 1100° F. in order to sublime the binder, which thereby produced a denser and less porous reactor than optimally preferred. This has been accomplished by the addition of powdered talc. The resultant binderless reactor cylinder formed at ambient temperature, therefore, includes alumina fibers in the less dense gamma phase. Accordingly, the reactor cylinder of the present invention is more porous and has a greater surface to weight ratio than reactor cylinders heretofore used.

It is therefore, a primary object of the present invention to provide a binderless thermocatalytic reactor cylinder for use in a radiant heater of the flameless gas combustion type.

It is another object of the present invention to provide such a reactor cylinder which includes powdered talc as a component thereof.

It is still another object of the present invention to provide such a reactor cylinder which is more porous and has a greater surface area than the binder-containing, reactor cylinders heretofore used.

It is yet still another object of the present invention to provide such a reactor cylinder which includes alumina fibers primarily in the gamma phase.

It is still yet another object of the present invention to provide a process for producing such a reactor cylinder.

SUMMARY OF THE INVENTION

To the accomplishment of the aforementioned objects and advantages, the present invention in brief summary, comprises a process for producing a reactor cylinder for use in a radiant heater which includes the steps of initially preparing a liquid vehicle which includes an alumina dispersion, magnesium sulfate, colloidal silica and powdered talc. The alumina dispersion includes dispersable alumina in an amount between about 1% and about 5% by weight, an acid in an amount up to about 0.2% by weight, and water in an amount between about 10% and about 30% by weight. The dispersion is then diluted by the addition of water in an amount between about 40% and about 80% by weight. To the diluted alumina dispersion is added magnesium sulfate in an amount up to about 4% by weight, colloidal silica in an amount up to about 10% by weight and powdered talc in an amount between about 0.0001% and about 0.01% by weight thus forming the liquid vehicle. A solid aluminum and silica fiber composition is then added to the vehicle in a ratio of about 10 g of fiber per gallon of vehicle. The mixture is then chopped, blended and vacuum molded about a mandrel to form the reactor cylinder.

DESCRIPTION OF THE PREFERRED EMBODIMENTS

The thermocatalytic reactor of the present invention is intended for use as the combustion source in a flameless radiant heater of the type described, for example, in U.S. Pat. No. 3,275,497 and, accordingly, is formed into a combustion or reactor cylinder for incorporation into such a heater.

The subject reactor cylinder is formed by preparing a liquid vehicle including an alumina dispersion, magnesium sulfate, colloidal silica, water, powdered talc and preferably tributyl sulfate as an antifoam agent. The vehicle is then admixed with a composition of alumina and silica fibers to form a slurry which is vacuum molded around a screen mandrel to form the reactor cylinder.

The alumina dispersion is initially prepared by admixing dispersable alumina with water and an acid. A preferred dispersable alumina is marketed by Remet Corporation of Chadwicks, N.Y. under the trade designation "Dispal." A preferred acid is hydrochloric acid, most preferably a 37% concentration thereof.

In forming the alumina dispersion, water, in an amount between about 10% and about 30% by weight based on the weight of the entire liquid vehicle, is admixed with an amount of acid sufficient to obtain a desired pH in the resultant liquid vehicle. It is preferred that the pH of the vehicle be between about 4 and about 6, preferably about 5. For Example, in order to prepare a vehicle with a pH within that range, it has been found necessary to add to the water a 37% concentration of hydrochloric acid in an amount between about 0.1% and about 0.2% by weight based on the weight of the entire vehicle. A particularly preferred amount of a 37% concentration of hydrochloric acid is between about 0.15% and 0.2% by weight.

To this water and acid mixture is then added the dispersable alumina in an amount up to about 5% by weight based on the weight of the entire vehicle and preferably in an amount between about 1% and 5% by weight. A particularly preferred amount of dispersable alumina is about 2% which is an amount sufficient to make a 10% dispersion of alumina.

The alumina dispersion is then substantially diluted by the addition of water in an amount between about 40% and about 80% based on the weight of the entire vehicle. Preferably, the alumina dispersion is diluted in water in an amount between 60% and 70% by weight and, most preferbly, in an amount between about 65% and about 70% by weight.

After dilution of the alumina dispersion, magnesium sulfate, in an amount up to about 4% by weight based on the weight of the entire vehicle, is added. A preferred amount of magnesium sulfate is between about 1% and about 2% by weight and a most preferred amount is between about 1% and about 1.5% by weight.

The mixture is then stabilized for a period of time, preferably overnight, at which time it becomes thixotropic.

After stabilization, colloidal silica in an amount up to about 10% by weight based on the weight of the entire vehicle is added to the mixture followed by vigorous mixing. A preferred colloidal silica is marketed by E. I. DuPont de Nemours of Wilmington, Delaware under the trade designation "Ludox AG". Preferably, the colloidal silica is added in an amount between about 5% and about 8% by weight and, most preferably in an amount between a about 6% and about 7% by weight.

Powdered talc, in an amount sufficient to cause the solid fiber portion to adhere together is then added to the mixture. Preferably powdered talc in an amount between about 0.001% and about 0.1% calculated by weight based on the weight of the entire vehicle is added. A particularly preferred amount of powdered talc is between about 0.0001% and about 0.0002%. It has been found that the addition of the powdered talc in the aforementioned amount permits formation of the reactor cylinder without the addition of the methyl methacrylate filler or binder heretofore required. Moreover, by the elimination of the filler or binder, it thus becomes unnecessary to sublime or decompose the filler or binder at elevated temperatures resulting in a phase transformation of the alumina.

After introduction of the powdered talc and after vigorous mixture, the liquid vehicle may contain an undesirable amount of entrapped air. It may therefore be desirable to deaerate the vehicle by the addition of an antifoam agent such as, for example, tributyl phosphate in an amount sufficient to eliminate the enbtrapped air, generally in an amount up to about 5 cc per gallon of liquid vehicle. A preferred amount of the antifoam agent is about 2 cc per gallon. After addition of the antifoam agent, the vehicle is further mixed until elimination of the remaining bubbles. The vehicle, which is then ready to receive the solid alumina and silica fibers, should have a pH of between about 4 and about 6, preferably about 5, and a specific gravity in excess of about 1.00.

The solid fiber portion consists of a mixture of alumina and silica fibers containing about 2% aluminum. A preferred source of the alumina and silica fibers is a commercially available product marketed by the Johns Manville Corporation under the trade designation "Cerachrome".

The solid fiber portion is added to the liquid vehicle and blended. Approximately ⅓ of a gallon of the liquid vehicle is added to approximately 10 g of the alumina and silca solid fiber portion. The mixture is then blended and chopped for a period of time followed by the addition of additional liquid vehicle to bring the total quantity of the resultant slurry to about one gallon. A preferred ratio in grams of solid fiber to gallons of liquid vehicle is between about 8:1 and about 12:1 and preferably about 10:1.

The reactor cylinder is formed from the above prepared slurry in a manner similar to the vacuum molding process described in U.S. Pat. No. 3,275,497. A vacuum tank and vacuum pump are required. A preferred vacuum pump is the Gast, Model 1022-103-G272X or an equivalent and a preferred vacuum tank is a 10 gallon, stainless steel model equipped with a vacuum gauge indicating 0-30 inches of mercury, a sight tube to show the liquid level, a vacuum breaker valve, and a drain valve. Also required are a slurry molding tank, preferably having a capacity of at least seven gallons, two lengths of vacuum hose, and a screen armature around which the reactor cylinder is molded. The screen armature is closed at one end and fitted with a gas/air feed tube at the other end. The screen is preferably formed around a 0.625" diameter mandrel and is preferably stainless steel wire mesh 0.16", 20×20. The gas/air feed tube is preferably 0.625 inch O.D. stainless steel.

To effect the process, one of the hoses is used to connect the outlet of the vacuum tank to the inlet of the vacuum pump and the other hose is used to connect the inlet of the vacuum tank to the gas/air feed tube at the end of the screen armature.

Approximately five gallons of the slurry are poured into the slurry molding tank. After starting the vacuum pump, the screen armature is introduced into the tank in approximately a vertical position and to within about two inches of the bottom of the tank. The screen armature is maintained in portion in the tank until the vacuum gauge reaches 24 inches of mercury at which time it is withdrawn while a vacuum is maintained. In this manner, the slurry is formed around the screen armature thus creating the molded reactor cylinder.

The vacuum pump is maintained in operation until the vacuum gauge falls to about four inches of mercury whereupon it is shut off and the reactor cylinder is disconnected from the vacuum hose. The reactor cylinder is then stored and the vacuum breaker valve opened and the depleted slurry drained. For subsequent formations of reactor cylinders, fresh armature screens are utilized.

While the reactor cylinder is still wet and relatively soft, its surface is divided into small areas for the purpose of interupting thermal strain lines during combustion which may result in flaking of the surface. This may be accomplished, for example, by pressing a form into the reactor cylinder surface. It may also be accomplished by placing the gas/air feed tube of the reactor cylinder in the chuck of a lathe and winding an ordinary sewing thread onto it in a continuous spiral having a pitch of about 0.125 inches and tensioned to make an indentation of about 0.030 inches. The free end of the thread may be secured by conventional means, i.e., tying or tape, and the reactor cylinder is then removed from the lathe. The thread will burn off during initial ignition with its pattern remaining permanently impressed in the surface of the reactor cylinder.

The reactor cylinder is then placed on a support rack and allowed to dry at which time it is ready for service. A kiln heating operation, heretofore necessary, is not required.

The following examples serve to further illustrate the method of the present invention and should not be construed as limiting the scope thereof.

EXAMPLE 1

The reactor cylinder of the present invention was formed by initially preparing a 10% alumina dispersion by admixing 3500 g of water with 30 g of 37% hydrochloric acid followed by the addition of 392 g of Dispal dispersable alumina. 4000 g of the resultant 10% alumina dispersion was then diluted in 12,000 g of water and 200 g of magnesium sulfate was added. After stabilization overnight, a thixotropic gel resulted. 1200 g of Ludox AG colloidal silica was added to the gel and mixed thoroughly followed by the addition under rapid agitation of 0.3 g of powdered talc per gallon of gel. 2 cc of tributyl phosphate were added as an antifoam agent thus forming the liquid vehicle.

Two thirds of a gallon of the liquid vehicle was introduced into a Waring blender followed by the addition of 10 g of Cerachrome alumina and silica fiber. The mixture was chopped at low speed for 15 seconds and at high speed for 90 seconds. Additional liquid vehicle was added to bring the total amount to one gallon followed by vigorous mixing to form a slurry.

Five gallons of the slurry were placed in a 7 gallon slurry molding tank. The reactor cylinder was formed around a stainless steel wire screen armature 0.016", 20×20 mesh closed at one end, and fitted with a 0.625" O.D. gas/air feed tube. A vacuum was drawn within the gas/air feed tube which was inserted into the slurry and maintained therein until a pressure of 24 inches was reached. At that time the tube was withdrawn, the vacuum cut off and the reactor cylinder disconnected from the vacuum pump. The resultant reactor cylinder was then permitted to dry and was then ready for use. It exhibited all properties of a commercially acceptable reactor cylinder.

EXAMPLE 2

The process of the Example 1 was followed with the exception that no powdered talc was added to the liquid vehicle. The resultant reactor cylinder formed was not commercially acceptable in that it was incapable of being molded about the air/gas mandrel.

Although the foregoing Examples illustrate certain features of the novel product and process of the present invention, it will of course be appreciated that the teachings of the application encompass broader and different combinations than those recited in the Examples. Accordingly, the present invention should only be limited by the scope of the appended claims.

What is claimed is:

1. A process for producing a reactor cylinder for use in a radiant heater, said process comprising the steps of:
    preparing a liquid vehicle including;
        an alumina dispersion including despersable alumina in an amount between about 1% and about 5% by weight of the entire vehicle; an acid in an amount up to about 0.2% by weight of the entire vehicle; and water in an amount between about 10% and about 30% by weight of the vehicle;
    diluting said dispersion by adding water in an amount between about 40% and about 80% by weight of the entire vehicle to form said vehicle;
    adding the following material to said vehicle, based on % weight of the entire vehicle, namely, magnesium sulfate in an amount up to about 4% by weight;

colloidal silica in an amount up to about 10% by weight; and powdered talc in an amount between about 0.0001% and about 0.1% by weight;

admixing with said liquid vehicle a combination of solid alumina and silica fibers in a ratio of grams of fibers to gallons of liquid vehicle of between about 8:1 and about 12:1;

blending said solid fibers and liquid vehicle to form a slurry; and vacuum molding said slurry about a mandrel to form said reactor cylinder.

2. The process of claim 1 wherein said alumina dispersion is about a 10% alumina dispersion.

3. The process of claim 2 wherein dispersable alumina is added in an amount between about 1% and about 3% by weight.

4. The process of claim 1 wherein said acid is hydrochloric acid in an amount sufficient to lower the pH of the liquid vehicle to between about 4 and about 6.

5. The process of claim 1 wherein the magnesium sulfate is added in an amount between about 1% and about 1.5% by weight.

6. The process of claim 1 wherein the powdered talc is added in an amount between about 0.0001% and about 0.0002% by weight.

7. The process of claim 1 wherein an antifoam agent is added to the liquid vehicle in an amount sufficient to eliminate any entrapped air.

* * * * *